(12) United States Patent
Stappaerts

(10) Patent No.: US 6,862,308 B2
(45) Date of Patent: Mar. 1, 2005

(54) HYBRID HEAT CAPACITY-MOVING SLAB SOLID-STATE LASER

(75) Inventor: Eddy A. Stappaerts, San Ramon, CA (US)

(73) Assignee: The Regents of the University of California, Oakland, CA (US)

(*) Notice: Subject to any disclaimer, the term of this patent is extended or adjusted under 35 U.S.C. 154(b) by 77 days.

(21) Appl. No.: 10/270,748

(22) Filed: Oct. 15, 2002

(65) Prior Publication Data

US 2003/0072341 A1 Apr. 17, 2003

Related U.S. Application Data

(60) Provisional application No. 60/329,831, filed on Oct. 15, 2001.

(51) Int. Cl.[7] .............................. H01S 3/17; H01S 3/04
(52) U.S. Cl. .......................................... 372/40; 372/34
(58) Field of Search ............................ 372/34, 40, 72, 372/75, 98

(56) References Cited

U.S. PATENT DOCUMENTS

| | | | | |
|---|---|---|---|---|
| 3,311,844 A | * | 3/1967 | Dicurcio | 372/68 |
| 4,555,786 A | * | 11/1985 | Byer | 372/70 |
| 4,567,597 A | * | 1/1986 | Mandella | 372/34 |
| 4,575,854 A | * | 3/1986 | Martin | 372/75 |
| 4,833,682 A | | 5/1989 | Byer et al. | |
| 4,845,721 A | * | 7/1989 | Hoffmann | 372/34 |
| 4,890,289 A | * | 12/1989 | Basu et al. | 372/33 |
| 5,172,388 A | * | 12/1992 | Long et al. | 372/70 |
| 5,233,624 A | * | 8/1993 | LaPlante et al. | 372/98 |
| 5,335,237 A | * | 8/1994 | Zapata | 372/33 |
| 5,526,372 A | | 6/1996 | Albrecht et al. | |
| 5,548,605 A | | 8/1996 | Benett et al. | |
| 5,757,842 A | * | 5/1998 | LaPlante et al. | 372/98 |
| 5,828,683 A | | 10/1998 | Freitas | |
| 5,923,481 A | | 7/1999 | Skidmore et al. | |

OTHER PUBLICATIONS

Sutton, S. B., et al., "Heat Removal in a Gas Cooled Solid–State Laser Disk Amplifier," AJAA Journal, vol. 30, No. 2, Feb. 1992, pp. 431–435.

Albrecht, G. F., et al., "Solid state heat capacity disk laser," Laser and Particle Beams (1998), vol. 16, No. 4, pp. 605–625.

* cited by examiner

Primary Examiner—Don Wong
Assistant Examiner—Hung Tran Vy
(74) Attorney, Agent, or Firm—Michael C. Staggs; Alan H. Thompson

(57) ABSTRACT

Laser material is pumped and its stored energy is extracted in a heat capacity laser mode at a high duty factor. When the laser material reaches a maximum temperature, it is removed from the lasing region and a subsequent volume of laser material is positioned into the lasing region to repeat the lasing process. The heated laser material is cooled passively or actively outside the lasing region.

20 Claims, 4 Drawing Sheets

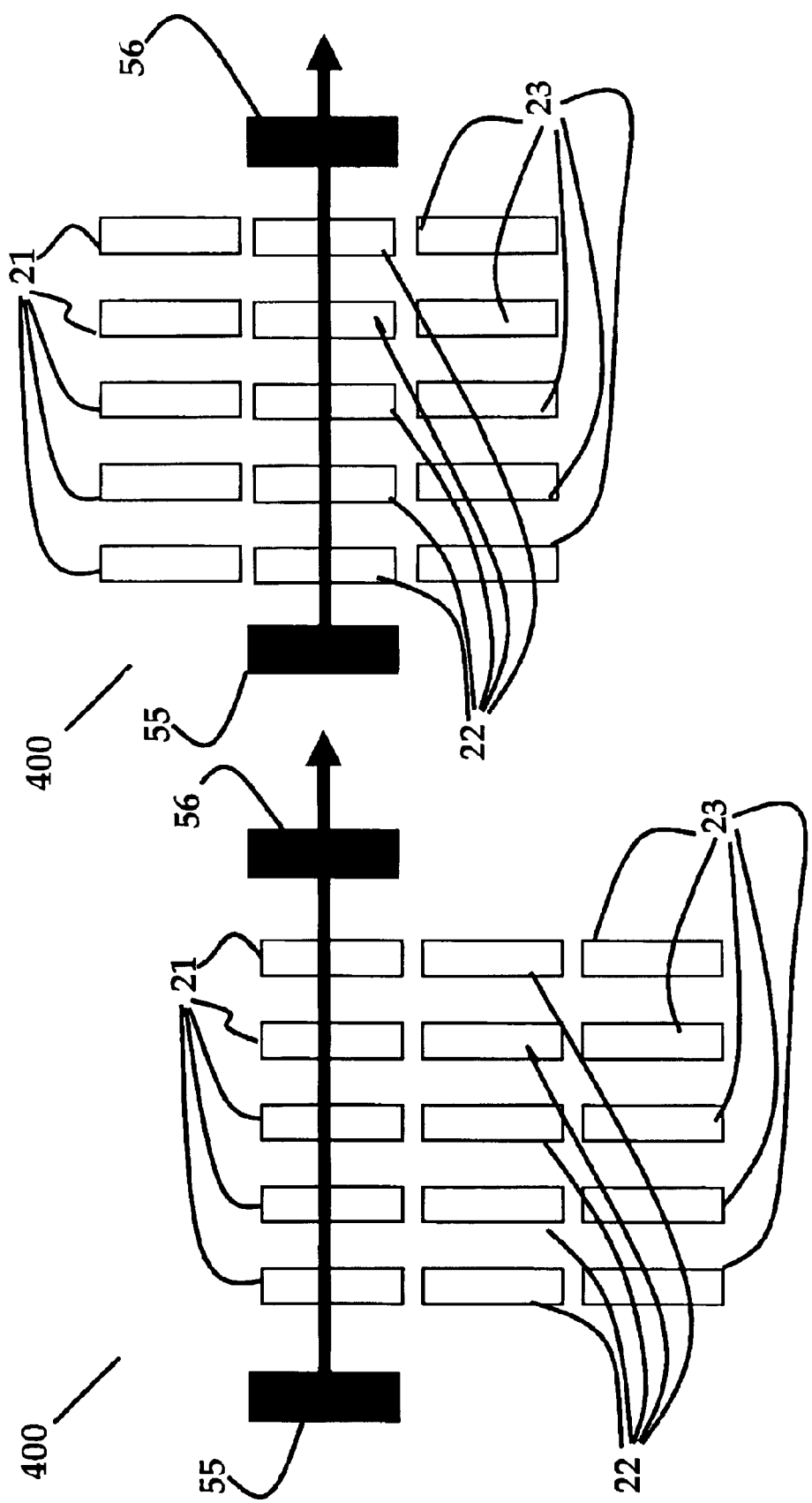

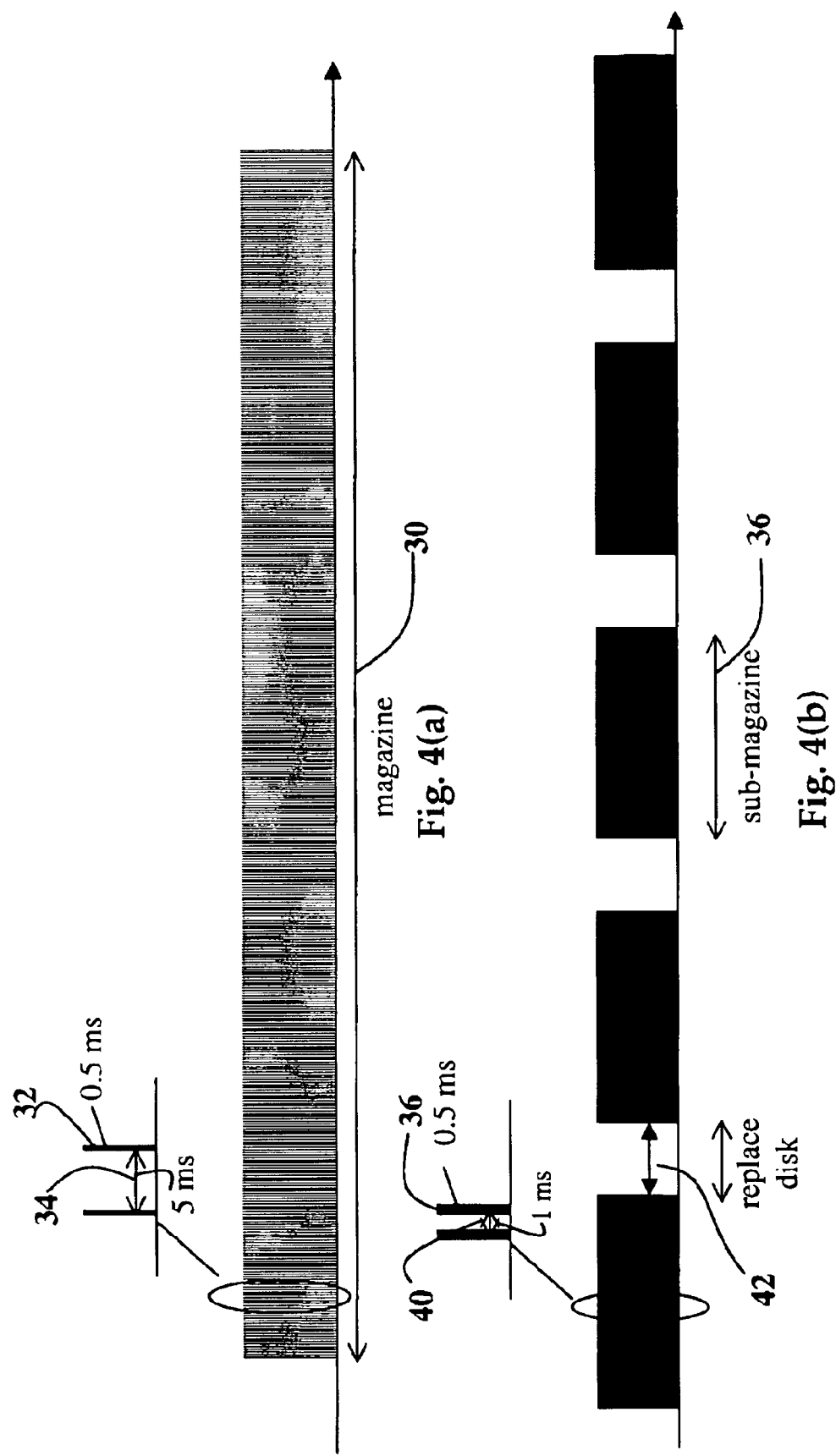

HYBRID HEAT CAPACITY-MOVING SLAB SOLID-STATE LASER

RELATED APPLICATION

This application claims the benefit of U.S. Provisional Application No. 60/329,831, filed Oct. 15, 2001, and entitled, "Hybrid Heat Capacity-Moving Slab Solid-State Laser," which is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a method and apparatus for a solid-state laser, and more particularly, of providing a high duty factor (i.e., pulse length×repetition rate), high energy, diode-pumped solid-state laser apparatus and method thereof.

2. State of Technology

Several techniques have been utilized to mitigate the effects of thermal gradients during solid-state laser operation. First, diode pumping to match absorption lines of dopant ions in the gain materials of laser materials, reduces the amount of waste heat generated. Second, convective gas flow across the surfaces of the active medium can help remove heat. Background for such a method is described by Sutton et al., in "Heat Removal in a Gas Cooled Solid-State Laser Disk Amplifier," AIAA Journal, Vol. 30, No. 2, pp. 431–435, (1992).

Another technique is to allow an active medium, i.e., a laser gain medium, to temporarily store the deposited heat. During laser operation, the active medium will heat up until it reaches some maximum acceptable temperature. The cooling cycle is then begun, in the absence of lasing, and elapsed time between periods of laser operation depends largely on the efficiency of the cooling of the laser during the suspended lasing action. Background for this concept, i.e., the Heat Capacity Laser (HCL), is described in U.S. Pat. No. 5,526,372, issued Jun. 11, 1996 to Albrecht et. al., and assigned to the assignee of the instant application. Additional background for this concept is described in "Solid state heat capacity disk laser," by Albrecht et al., Laser and Particle Beams Vol. 16, pp. 605–625, 1998.

Another technique is to move a volume of the active medium by translation and/or rotation, in front of a pumping source. The source illuminates only a part of the active medium volume, while the entire volume is being cooled continuously. Background information on such a technique is disclosed in U.S. Pat. No. 4,833,682, titled "Moving Slab Laser," issued May 23, 1989 to Byer et al.

The emergence of high average power diode arrays beyond the conventional technologies in which typically only a single laser diode bar is attached to a single high performance heat sink have enabled monolithic laser diode packages in which multiple diode bars are attached to a single high performance heat sink. This technology advance has led to larger laser diode arrays and larger diode-pumped laser systems. Background for one such type of package, which utilizes Silicon Monolithic Microchannels (i.e., SiMM) is described and claimed in U.S. Pat. No. 5,548,605 issued Aug. 20, 1996 to Benett et al., U.S. Pat. No. 5,828,683 issued Oct. 27, 1998 to Freitas, and U.S. Pat. No. 5,923,481 issued Jul. 13, 1999 to Skidmore et al., and assigned to the assignee of the instant application.

The instantaneous power provided by these diode arrays needs to be sized for efficient HCL operation, but this power is utilized only a fraction of the time that results in a low duty factor, i.e., the ratio of the time on to the sum of the time on and off times (or, equivalently, pulse length×repetition rate). Since diode cost is about proportional to instantaneous power, (i.e., the optical power output for the time period on), and not average power, (i.e., the product of the instantaneous power and the duty factor), the low duty factor results in a cost penalty inversely proportional to the duty factor. This cost penalty is large since diode array cost dominates laser system cost.

Accordingly, the present invention provides a solution for increasing the duty factor for solid-state lasers pumped by exemplary diode arrays.

SUMMARY OF THE INVENTION

Accordingly, the present invention provides an optically pumped cost effective laser system capable of sequentially receiving a bank of one or more active medium volumes (e.g., disks, rods), from a row of banks having one or more active medium volumes.

Another aspect of the present invention provides an optically diode-array pumped cost effective laser system that is operated in a heat capacity mode and capable of rapidly sequentially receiving a bank of one or more active medium volumes from a row of banks having one or more active medium volumes.

A further aspect of the present invention provides a laser method including: sequentially positioning a bank having one or more active medium volumes that is disposed in a row of banks each having one or more active medium volumes within a resonant cavity, optically pumping in a heat capacity mode each of the sequenced bank of active medium volumes within the resonant cavity, optically extracting a laser beam from each of the sequenced bank of active medium volumes within the resonant cavity; and cooling each of the sequenced bank of active medium volumes.

Accordingly, the present invention addresses problems associated with high duty factor, diode array pumped, solid-state lasers by operating in a hybrid heat-capacity moving slab mode. The system and method disclosed and claimed herein after reduces laser diode-array cost, reduces required crystal disk size, and simplifies parasitic suppression.

BRIEF DESCRIPTION OF THE DRAWINGS

The accompanying drawings, which are incorporated into and form a part of the disclosure, illustrate an embodiment of the invention and, together with the description, serve to explain the principles of the invention.

FIG. 3 illustrates the Hybrid Heat-Capacity-Moving Slab Laser of the present invention.

FIG. 4 illustrates operational time-lines for a conventional heat capacity laser and for a Hybrid Heat Capacity Moving Slab Laser.

DETAILED DESCRIPTION OF THE INVENTION

Referring now to the following detailed information, and to incorporated materials; a detailed description of the invention, including specific embodiments, is presented.

Unless otherwise indicated, numbers expressing quantities of ingredients, constituents, reaction conditions and so forth used in the specification and claims are to be understood as being modified by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

General Description

The present invention provides an apparatus and a resulting method for operating a hybrid configuration of a heat capacity laser (HCL) and a moving slab laser (MSL).

Figure 1:
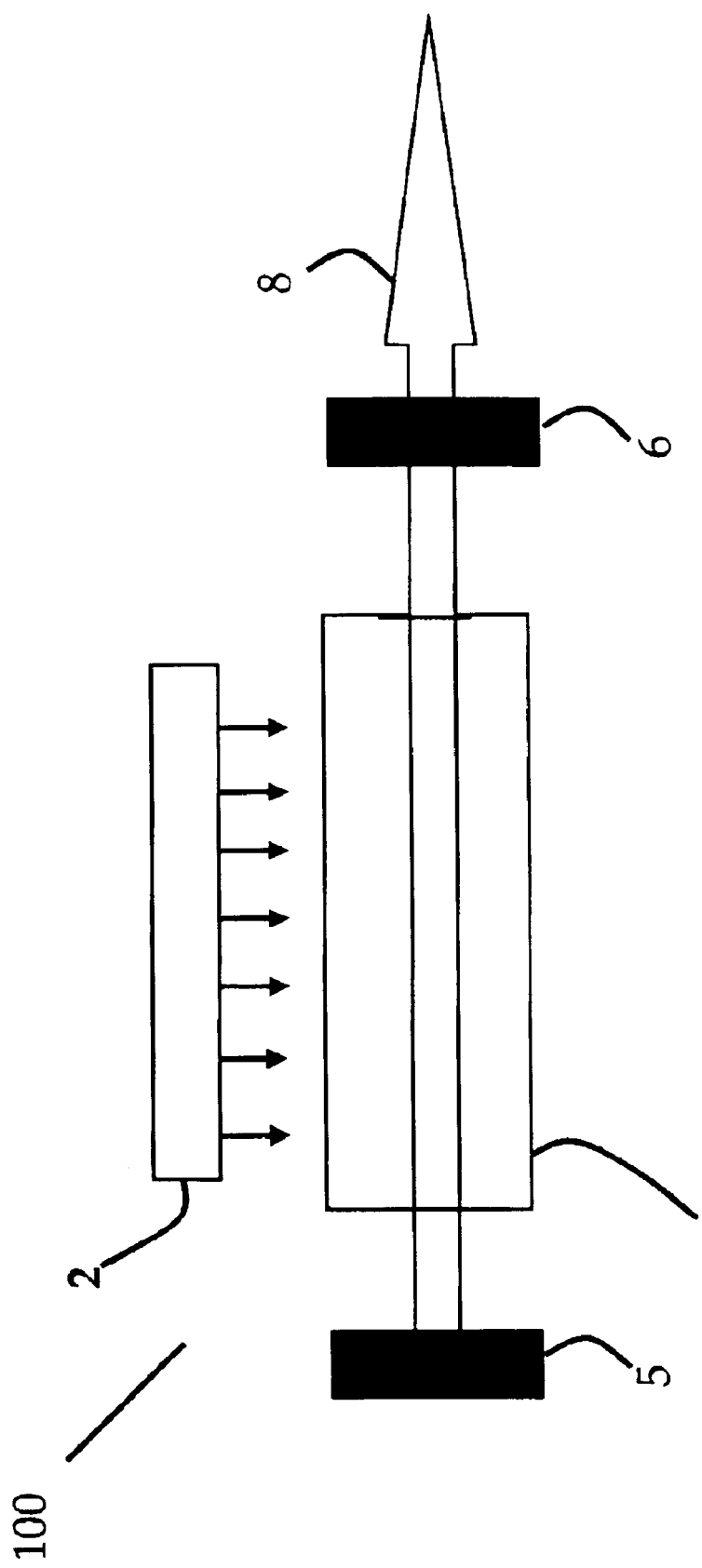
FIG. 1 illustrates a conventional architecture for a Heat Capacity Laser.

FIG. 1 illustrates a conventional diode-pumped solid-state laser operated in the heat capacity mode and is generally referenced by the numeral 100. An active medium 1 includes one or more slabs or one or more rods or one or more disks. An electromagnetic radiation source 2 such as a diode array optically pumps light into an active medium 1. A high reflector 5 and an output coupler 6 form a resonator cavity (not denoted) and permits laser oscillation to generate a beam of laser output 8. Cooling (not shown) can be passive, i.e., by allowing to cool on its own, or active in the form of a liquid or a gas. HCLs are typically operated in the pulsed mode. The duty factor for the laser operation is the ratio of the laser pulse length and the sum of the pulse length and the inter-pulse time. Due to fundamental design constraints, the duty factor is typically low, about 10 percent, resulting in ineffective use of diode arrays for optical pumping. Instantaneous diode array power is designed for efficient HCL operation but this power is only utilized a fraction of the time even though appropriate arrays have the capability for near 100 percent duty factor.

With HCLs, the laser operation is broken into discrete and sequential operating steps. During the lasing step, active medium 1 (i.e., the laser material) is thermally well insulated and no cooling is present. As lasing proceeds, waste heat is deposited within active medium 1 until it reaches some maximum allowable temperature. The duration of the pumping/lasing phase of a HCL is called the magazine depth. During this time, the active medium temperature increases to a maximum value set by the properties of active medium 1 and/or by engineering constraints. When this temperature is reached, pumping/lasing is stopped, and the original operating temperature is reset by passive or active cooling. The pumping/lasing-cooling cycle is then repeated. Thus, the active medium volumes are operating in a thermal storage mode during the time lasing i.e., photon emission, from the active medium volumes is being produced. Since the amount of energy extracted from the laser is related to the thermal energy, the energy that can be extracted from the laser is therefore related to its mass, the heat capacity of the active medium volumes and the temperature difference over which it is operated.

In the heat capacity method of operation, an inversion of the temperature distribution results in compressive stresses on the outer surfaces of the active medium, i.e., the large pump faces for laser slabs. It is the combination of inverted temperature and stress distributions that allows for a much higher average burst capability in the heat capacity mode as opposed to conventional laser systems that cool the active medium at the same time as lasing. Such a method of operating a heat capacity laser is disclosed in U.S. Pat. No. 5,526,372, titled "High Energy Bursts From A Solid State Laser Operated In The Heat Capacity Limited Regime," by Albrecht et al., which is fully incorporated herein by reference in its entirety.

Figure 2:
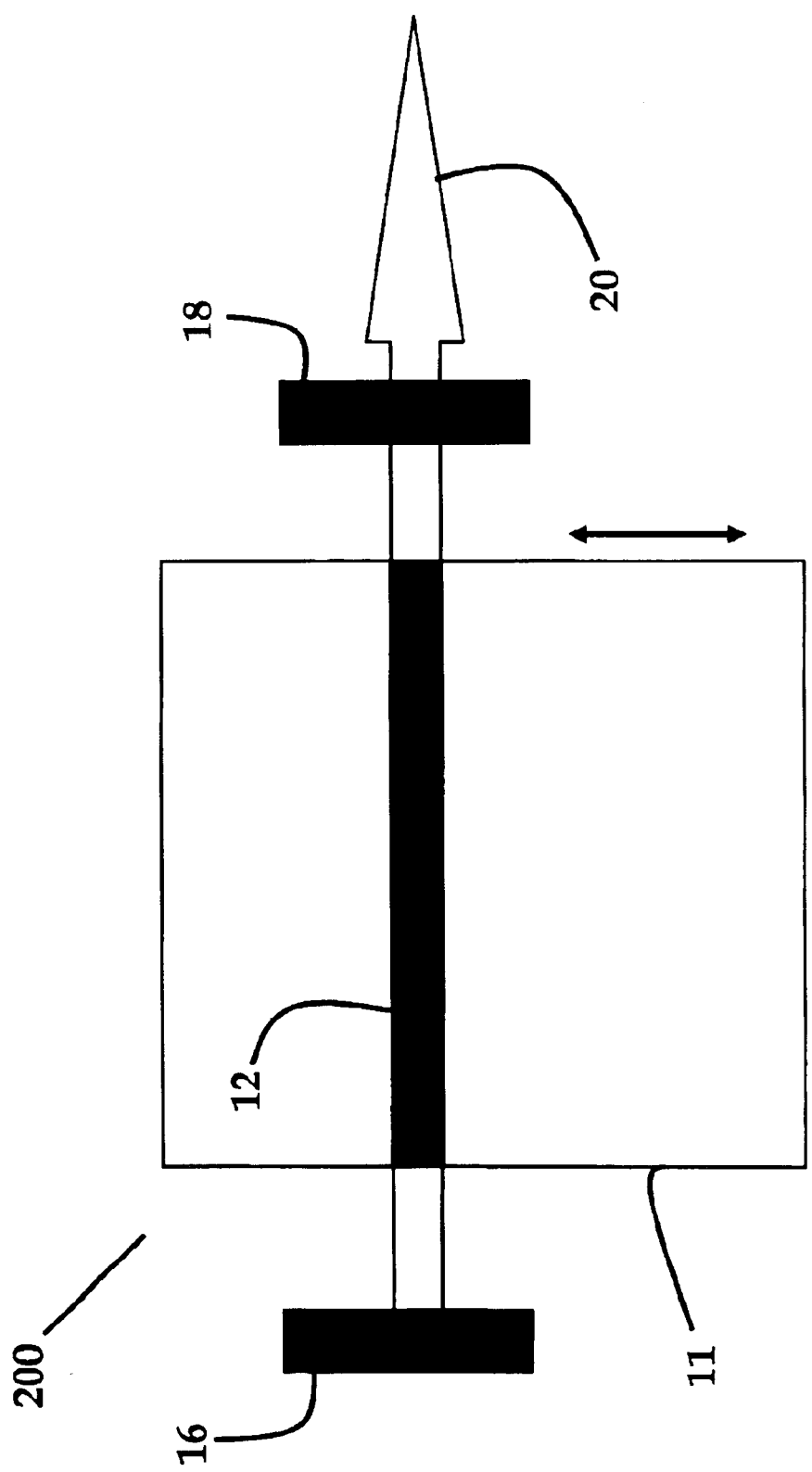
FIG. 2 illustrates a conventional architecture for a Moving Slab Laser.

FIG. 2 illustrates a conventional diode pumped moving slab solid-state laser and is generally referenced by the numeral 200. An active medium volume 11 generally includes a slab with a part 12 of the active medium being pumped by an electromagnetic source (not shown) such as a diode array. A high reflector 16 and an output coupler 18 form a resonator cavity (not denoted) and permits laser oscillation to generate a beam 20 of laser output. Cooling in the form of a liquid or gas (not shown) is continuously applied to heated part 12 of active medium 11. With Moving Slab Lasers (MSL), the pumping/lasing and active cooling cycles are simultaneous, and continuous laser operation is possible.

Specific Description

In the present invention, the HCL method and/or apparatus integrate with the MSL method and/or apparatus. Thus, one or more volumes of solid-state laser material are sequentially pumped, such as by diode arrays, and the energy stored within the volumes are extracted from a predetermined resonant cavity, i.e., the laser cavity. When a volume reaches a maximum temperature "i.e., after a magazine depth," it is moved from the pumping region and to a cooling region and a new volume is rapidly introduced into the resonant cavity. The pumping source is activated again for a time period equal to the magazine depth. The design parameters for such a system are chosen to provide a high duty factor of operation during each of the magazines, resulting in an efficient use of the pumping means, such as for example, a diode array.

Diode array, (e.g., Silicon Monolithic Microchannels (SiMM)) technology development has enabled researchers to pursue higher energy extraction and more efficient laser systems. Such technology incorporates the formation of V-grooves for positioning and mounting laser diode bars by Anistropic etching of silicon substrates. In exemplary <110>oriented silicon wafers, (the surface of the wafer is a <110>plane), etch rate differences can be exploited to etch channels that are perpendicular to the surface of the wafer. Such etching is accomplished by creating a mask on the surface of the wafer that is aligned with the <111>planes on the wafer. When etched, these slow-etching, perpendicular <111>planes then become the walls of the channels. With the appropriate angular orientation of an etch mask on a <110>oriented silicon wafer, the result of the above etching method is to produce V-grooves, wherein laser emitting diodes or laser diode bars are attached to the slanted surfaces, i.e., the <111>plane, and accordingly are oriented to produce an emission direction in a very specific way relative to the <110>normal direction (e.g., 55 degrees).

Simm arrays with a nonzero emission angle, measured from the normal to the array surface, are useful in pump configurations such as normal incidence large aperture laser disk architectures. Such architectures provide better energy extraction efficiencies, lower Nd dopant requirements that improve crystal quality, minimize losses, better beam quality despite any residual thermal gradients in the laser gain disks or slabs, polarization independent extraction, and denser, compact system packaging. However, the arrival of Simm diode array technology is additionally capable of being integrated into non-normal incidence geometries (e.g., Brewster angle geometries for polarized systems) to provide a substantially equal high duty factor of operation that is also capable of being integrated into the present invention. Silicon Monolithic Microchannels (i.e., SiMM) is described and claimed in U.S. Pat. No. 5,548,605 issued Aug. 20, 1996 to Benett et al., U.S. Pat. No. 5,828,683 issued Oct. 27, 1998 to Freitas, and U.S. Pat. No. 5,923,481 issued Jul. 13, 1999 to Skidmore et. al., and is incorporated by reference herein in its entirety.

Referring to FIGS. 3(a) and 3(b), the following description and design considerations provide operation of the Hybrid Heat Capacity-Moving Slab Solid-State Laser, generally designated by reference numeral 400 in both figures. As shown in FIG. 3(a), a volume of a bank 21 of one or more active medium volumes, is transversely or longitudinally pumped by an excitation source (not shown), such as by one or more diode arrays as described herein before, until a maximum temperature is reached (i.e., a magazine depth). Moreover, bank 21 of one or more active medium, from a row of banks 22, 23, of one or more active medium may employ Neodymium Gadolinium Gallium Garnet (Nd:GGG or "GGG" for short) as one embodiment for the laser material that are used as the active medium. Additional embodiments, such as, but not limited to Neodymium doped Yttrium Aluminum Garnet (Nd:YAG), or Neodymium doped glass (Nd:Glass) capable of producing the requirements of the present invention can additionally be employed as an alternative for the active medium volumes that are in each bank 21, 22, 23.

Unlike a conventional Heat Capacity Laser, bank 21 of one or more active medium volumes is sequentially positioned rapidly from a pumping region (not shown)/laser resonator (not denoted), as defined by high reflector 55 and output coupler 56 in both figures, by a mechanical means (not shown) as illustrated in FIG. 3(b). Such mechanical means include but are not limited to, a 2-dimensional framed matrix of stored active volumes that allows insertion by a transverse translation, a swing arm mechanism that retrieves active medium volumes from a storage area, and a two dimensional translation apparatus that allows active medium volumes to be translated into/out of a carrier and into/out of a laser resonator cavity using a carriage and arm mechanism. Such a sequential positioning is required because of the generated heat by the optical pumping of one or more diode arrays (not shown) and because it allows efficient use of exemplary diode arrays. Therefore, such a positioning is desired to be performed rapidly. A new volume of a bank 22 of one or more active medium is then sequentially positioned into the resonator (not denoted) as defined by high reflector 55 and output coupler 56, from one or more rows 21, 22, 23 of banks of one or more active medium as shown in FIG. 3(a) and FIG. 3(b), and optically pumped for a time equal to a magazine depth. As an illustrative example, for a duty-factor of 10% in a conventional HCL, for 5 pieces of sequentially pumped active medium volume, the "effective" duty-factor (during the magazine depth) is increased from 10% to 50%. Such an increased duty-factor reduces required diode laser instantaneous power, and therefore results in diode laser cost reduction by about a factor of 5.

Heated active medium volumes 21, are capable of being cooled after medium 21 is moved out of the resonator by a linear translation, as shown in FIG. 3(a), or by rotation, i.e., an annular translation (not shown).

FIGS. 4(a) and 4(b) show representative time-lines for conventional Heat Capacity Laser operation and for Hybrid Heat Capacity Moving Slab Laser (HCL-MSL) operation, respectively. FIG. 4(a) represents a design example of a 100 kW HCL with a 10 second magazine 30 depth and 10 disks (not shown) arranged as 5 pairs (not shown). A laser with a pulse-width 32 operating at 200 Hz (i.e., pulse separations 34 are 5 msec) corresponds to a diode array factor of 10%.

FIG. 4(b) represents a HCL-MSL design example according to the present invention with a 2 second (sub)-magazine 36 depth of a bank (not shown) of 10 smaller disks (not shown) arranged as 5 pairs (not shown). Because each bank in this example has a 2 second sub-magazine 36 depth, the total magazine depth (5 banks×2 seconds) is still 10 seconds. A laser (not shown) output with a pulse-width 38 operating at 1000 Hz (i.e., pulse separations 40 are 1 msec) now corresponds to a duty factor of 50%. Typically a time 42 needed to remove a heated bank (not shown) of laser medium volumes and insert a cool one is less than sub-magazine depth 36.

HCL hybrid operation of the present invention is described by the following equations (1)–(4), for one or more active medium volumes, e.g., laser disks, a diode array duty factor $\delta$, a diode array area A, and a diode array cost $C_d$. Requirements are the average output power $P_{out}$, and magazine depth $\tau_{mag}$. Material-dependent parameters are a pump photon energy, $h\nu_p$, a stimulated emission cross-section $\sigma$, an upper-level lifetime $\tau_u$, a quantum efficiency $\eta_q$, a material density $\rho$, and a specific heat $C_p$. Design parameters to optimize are the diode array intensity, $I_d$, an unsaturated single-pass gain G, disk thickness t, and a disk temperature swing $\Delta T$. These parameters are constrained by the available diode array irradiance, (i.e., W/cm$^2$), a laser gain-to-loss ratio required for efficient laser extraction, and a temperature at which the extraction efficiency decreases due to reduced laser gain.

$$M = h\nu_p G/[2\sigma I_d \eta_a \tau_u] - G/I_d \tag{1}$$

$$\delta = \rho C_p t \Delta T/[2I_d \eta_q (1-\eta_q)\tau_{mag}] \sim t \Delta T/[I_d \tau_{mag}] \tag{2}$$

$$A = P_{out}/[2I_d \eta_a \eta_q \eta_{ext} \delta M] \sim 1/[I_d \delta M] P_{out} \sim 1/[t\Delta TM] P_{out} \tau_{mag} \tag{3}$$

$$C_d = P_{out} C_W/[\eta_a \eta_q \eta_{ext} \delta] \sim P_{out} C_W/\delta \sim I_d P_{out} \tau_{mag}/[t\Delta T] \tag{4}$$

Disk absorption efficiency $\eta_a$, is maximized and is near unity for optimal design. Extraction efficiency $\eta_{ext}$, is determined by the laser gain-to-loss ratio and, therefore, the pumping intensity with typical values from about 40% to about 80%. Diode array cost per peak-Watt is denoted by $C_W$. Equations (1) and (3) are derived from conventional expressions for laser gain and output power, respectively. Equation (2) is the thermodynamic equation, Q=mc$\Delta$T, where m (mass of the active medium volumes)=$\rho$At. Equation (4) relates total diode array cost to array area and pumping intensity.

Table 1 shows representative parameters using the above equations for two exemplary designs for a system with Nd:GGG as an example active medium, one according to conventional HCL technology (i.e., Design 1), and a hybrid design (i.e., Design 2) according to the present invention. The average output power of both systems is 40 kW.

TABLE 1

|  | Design-1 | Design-2 |
| --- | --- | --- |
| $\tau_{mag}$ (sec) | 10 | 2 × 5 |
| Pulse length (ms) | 0.5 | 0.5 |
| Number of disks | 10 | 10 × 5 |
| Energy-pulse (Joules) | 160 | 50 |
| Rep-rate (Hz) | 250 | 800 |
| Duty-factor | 0.08 | 0.4 |
| Disk thickness (cm) | 1.5 | 1.5 |
| Disk width, height (cm) | 8 × 8 | 3.6 × 3.6 |
| Small signal gain along width | exp(2.8) | exp(1.3) |

As illustrated from Table 1, Design-2 provides benefits over the conventional technology of Design-1. First, the duty factor is increased from 8 percent to 40 percent. Second, the size of the laser disks is reduced from 8 cm to 3.6 cm. Although the number of disks is increased because the total volume of active medium volumes is the same in both cases (i.e., the output energy during the "effective" magazine depth of 10 seconds is the same), smaller disks can be cut from smaller crystal boules, a significant benefit because of the complexity/cost of growing large laser-quality crystals. A third benefit is a decrease in small-signal gain along the sides of the laser disks. Such reduced gain allows a simplified edge-cladding design for preventing parasitic oscillations (i.e., unwanted oscillations that reduce output energy) within the individual disks.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An apparatus, comprising:
    a resonant cavity, defined along an optic axis and capable of sequentially receiving a bank of one or more active medium volumes disposed in a row of banks having one or more active medium volumes,
    a means for sequentially positioning each of the bank of active medium volumes from the row of banks within the resonant cavity,
    a source of electromagnetic radiation to provide a selected wavelength band for optically pumping each of the received banks of one or more active medium volumes, wherein each of the received banks of one or more active medium volumes is constructed to operate in a heat capacity mode,
    an optical means for extracting a laser beam having a predetermined wavelength band from the resonant cavity from each of the sequenced bank of active medium volumes; and
    a means for cooling each of the sequenced bank of active medium volumes.

2. The apparatus of claim 1, wherein the source of electromagnetic radiation further comprises one or more laser diodes arranged as one or more pump array surfaces to provide the selected wavelength band.

3. The apparatus of claim 2, wherein the one or more laser diodes further comprise a plurality of laser diode bars arranged as the one or more pump array surfaces to provide the selected wavelength band.

4. The apparatus of claim 1, wherein the active medium includes a laser gain material selected from the group consisting of Neodymium(Nd)-doped glass and Neodymium-doped gallium gadolinium garnet (Nd:GGG).

5. The apparatus of claim 1, wherein each received bank of one or more active medium volumes is sequentially positioned out of the resonator cavity and subsequently cooled.

6. The apparatus of claim 1, wherein the cooling means is passive or active.

7. The apparatus of claim 1, wherein the row is annular.

8. The apparatus of claim 1, wherein the row is linear.

9. The apparatus of claim 1, wherein the apparatus is capable of producing a repetition-rated laser system with a duty factor of up to 100 percent (CW).

10. The apparatus of claim 1, wherein each of the active medium is a slab or disk oriented at a Brewster's angle with respect to the optic axis.

11. The apparatus of claim 1, wherein each of the active medium is oriented substantially normal to the defined optic axis.

12. The apparatus of claim 1, wherein the radiation that provides the selected wavelength band for optical pumping is directed at a designed angle θ with respect to a front and a back surface of each of the active medium, wherein θ is greater than 0°.

13. The apparatus of claim 1, wherein each of the active medium volumes further comprises a laser gain material having transverse dimensions between about 1 cm×1 cm and about 15 cm×15 cm and a thickness of up to 4 cm.

14. The apparatus of claim 13, wherein each of the active medium volumes has a decreased small signal gain such that resultant parasitic oscillations within each laser volume are capable of being minimized.

15. A method comprising:
    sequentially positioning a bank having one or more active medium volumes, disposed in a row of banks each having one or more active medium volumes, within a resonant cavity,
    optically pumping in a heat capacity mode each of the sequenced bank of active medium volumes within the resonant cavity,
    optically extracting a laser beam from each of the sequenced bank of active medium volumes within the resonant cavity; and
    cooling each of the sequenced bank of active medium volumes.

16. The method of claim 15, wherein each received bank of one or more active medium volumes is sequentially positioned out of the resonator cavity and subsequently cooled.

17. The method of claim 15, wherein the row is annular.

18. The method of claim 15, wherein the row is linear.

19. The method of claim 15, wherein each of the one or more active medium volumes is a slab or disk oriented at a Brewster's angle with respect to the optic axis.

20. The method of claim 15, wherein each of the one or more active medium volumes is oriented substantially normal to the defined optic axis.

* * * * *